US006311780B1

(12) United States Patent
Zuev et al.

(10) Patent No.: US 6,311,780 B1
(45) Date of Patent: Nov. 6, 2001

(54) METHOD FOR EXTINGUISHING FIRES FROM AN AIRCRAFT AND RELATED DEVICE

(75) Inventors: Jury Vladimirovich Zuev, Moskovskaya; Alexandr Vladimirovich Karpyshev, Moscow; Igor Aleksandrovich Lepeshinsky, Moscow, all of (RU)

(73) Assignee: Nauchno-Issledovatelsky Inst. Nizkikh Temperatur Pri Mai, Moscow (RU)

( * ) Notice: Subject to any disclaimer, the term of this patent is extended or adjusted under 35 U.S.C. 154(b) by 0 days.

(21) Appl. No.: 09/601,696

(22) PCT Filed: Feb. 1, 1999

(86) PCT No.: PCT/RU99/00028

§ 371 Date: Oct. 12, 2000

§ 102(e) Date: Oct. 12, 2000

(87) PCT Pub. No.: WO99/39977

PCT Pub. Date: Aug. 12, 1999

(30) Foreign Application Priority Data

Feb. 6, 1998 (RU) ................................................ 98101933

(51) Int. Cl.[7] ....................................................... A62C 2/00
(52) U.S. Cl. ................................. 169/46; 169/52; 169/53
(58) Field of Search ................................ 169/52, 53, 46, 169/9, 11; 239/8, 171, 311, 369; 244/136

(56) References Cited

U.S. PATENT DOCUMENTS 4,018,060 * 4/1977 Kinsell et al. ........................... 62/91
4,090,567 * 5/1978 Tomlinson ............................. 169/53
4,915,300 * 4/1990 Ryan ....................................... 239/9
5,014,790 * 5/1991 Papavergos ............................ 169/44
5,385,208 * 1/1995 Baker et al. ........................... 169/46

* cited by examiner

*Primary Examiner*—David A. Scherbel
*Assistant Examiner*—Davis Hwu
(74) *Attorney, Agent, or Firm*—Rothwell, Figg, Ernst & Manbeck

(57) ABSTRACT

The present invention comprises supplying a liquid onto the source of a fire from an aircraft (7), wherein said liquid is supplied in the form of gas-droplet stream (8) obtained by dispersion in a gas flow and by acceleration of the dual-phase flow in a gas-dynamics nozzle (4). The pressure at the inlet of the nozzle (4) as well as the relative concentration of liquid in the dual-phase flow are selected according to conditions enabling the formation of a dual-phase low-dispersion and high-speed flow which has a high extinguishing-substance concentration and remains stable when submitted to interference.

The fire-extinguishing device of the present invention comprises a liquid supply system (1), a gas supply system (2), a mixing chamber (3) for the gas and the liquid as well as a gas-dynamics nozzle (4), wherein all these members are is arranged onboard on aircraft (7). The gas-dynamics nozzle supplies the liquid towards the area of the fire source and is connected to a vessel through a duct. The mixing chamber (3) is further provided with a liquid dispersion system.

25 Claims, 7 Drawing Sheets

METHOD FOR EXTINGUISHING FIRES FROM AN AIRCRAFT AND RELATED DEVICE

FIELD OF THE ART

A group of inventions is related to fire fighting techniques and aviation engineering, namely, it concerns fire fighting aviation means applied for extinguishing the fire sites on the inaccessible territories, in multistory buildings or in cases when the supply of fire extinguishing means is required from rather a great height.

PRIOR STATE OF THE ART

At present are known different methods and devices to extinguish fires by way of releasing liquid from special vessels on board an aircraft, preferably airplanes.

Thus, e.g., from Patent PL 127704 a device is known designed for fire extinguishing with the help of airplanes, which houses vessels for liquid storage, two liquid drain throats, an air inlet connected with the upper part of the vessels and controlled drain valves.

Utilization of two holes for liquid drain gives and opportunity to have different liquid consumption depending on combination of valve openings. This allows, in its turn, to extinguish fire on a large territory or create long closed zones of liquid dropping around the dire site. The prior art device employs the incoming air flow for liquid expulsion from the vessels and represents itself a detachable unit, which can be fixed on board a multi-purpose airplane.

A prior art method of liquid drain from an aircraft (Patent FR 2610894) is known, which includes a liquid drain through a branch pipe coming out of the airplane body in the direction opposite to the flight direction. The liquid drain in the prior art decision takes place both under force of gravity and excessive pressure of about 0.5 bar created by a pressurization system in the liquid vessel.

Another prior art method of liquid drain from an airplane (Patent CA 975733) is also known, which consists in liquid drain through a hole in the tank bottom. During the drain process there takes place the liquid atomization into drops, while it is passing through a profiled grid arranged in the outlet section of a drain hole.

The analog of a device claimed is the one of fire extinguishing with the aid of an aircraft (Application RU 94012947A1). The prior art device includes liquid drain in the form of a directed jet parallel to the incoming air flow, within the range of an aircraft angle of incidence, in the direction opposite to the flight direction. At the boundary of a free jet the direct proximity of the outlet section exit of a drain branch pipe a pressure area is produced, which is excessive in relation to air pressure overflowing the rest part of the jet and increasing with boundary distance from the jet axis. The air flow incoming onto the frontal surface of a liquid jet is inclined downwards, thus reducing the air flow component perpendicular to the jet. On account of this an impulse decrease imparted to a frontal jet surface and a jet deformation decrease, i.e. a directed liquid flow control, are achieved This effect is materialized in the prior art design with the aid of special aerodynamic surfaces placed in front of the jet below a drain branch pipe or with the aid of a profiled annular wing embracing the jet.

The analog of a device claimed if the one of fire extinguishing with the aid of an aircraft (Application RU 94012947A1). The prior art device comprises a drain unit with a branch pipe of a round section directed in parallel to the aircraft body opposite to the flight direction and placed outside the aircraft. The drain unit structure also comprises an annular wing connected with the branch pipe by means of pylons. Being in the air flow a circular wing embraces a free liquid jet and creates an excessive pressure area on its boundary in relation to the air flow pressure overflowing the rest part of the jet. In its bottom the wing has an S-type profile, on account of which the air flow incoming onto the frontal surface of the jet declines downwards. It results in impulse reduction transferred to the frontal surface of the jet and, hence, its deformation. The profited wing allows to control a directed liquid flow in this manner.

The most closely analogous method to the one claimed is a method of fire extinguishing with an aircraft applied described in U.S. Pat. No. 3,604,509. The prior art method includes liquid dispersion in a gas flow, acceleration of a generated dual-phase flow in a gas-dynamics nozzle, and a directed supply of an accelerated gas-droplet stream to the fire site from the aircraft board. A foam-generating fluid is used as a liquid meant for fire extinguishing in the prior art design, which determines a mixing chamber and nozzle configuration, with the help of which a directed dropping of generated foam from an aircraft board to the fire site is reduced to practice. The choice of foam-generating fluid and gas parameters fed into the flow mixing chamber as well as that of nozzle dimensions in the prior art design depends on a desired foam ball size and the required foam consumption.

The most closely analogous device to the one claimed is a fire extinguishing device with the aid of an aircraft described in U.S. Pat. No. 3,604,509. This prior art device includes a liquid vessel designed for fire extinguishing, a mixing chamber of liquid and gas connected via a pipeline with the vessel and a gas flow supply system, a means of foam-generating fluid dispersion fed into the mixing chamber, a gas-dynamics nozzle to supply a gas-droplet stream into a fire-site, and a directed gas-droplet stream control system. In this device a foam-generating fluid is used as a working fluid and a problem of generating a foam flow with a ball size control is being solved. The foam balls generated at the nozzle exit during an operating process have a negligible initial velocity but a large external surface, which does not allow to produce a 50 m range directed dual-phase flow stable in relation to external effect factors.

The said analogs of the inventions claimed serve for extinguishing substance concentration increase with a directed supply from board an aircraft. However, these designs only partially eliminate the incoming air flow effect and do not allow to control a gas-droplet stream in a wide range of directions, neither they compensate inertia forces acting on the jet from the aircraft side. That is, the prior art analogs do not allow to completely compensate distributing factors, first and foremost, the aerodynamic forces acting on a directed flow of fire extinguishing fluid and, hence, have a limited fire extinguishing efficiency.

The main factors having an influence on fire extinguishing efficiency are: extinguishing substance consumption, a flow of which is directed to the fire site, the size and velocity of extinguishing substance drops at the fire site approach. The fire extinguishing efficiency increases with extinguishing fluid consumption and its drop velocity increase, as well as with the drop size decrease.

In prior art designs a liquid jet spray takes place at a relatively low gas-droplet stream speed supply from board an aircraft, therefore the drop velocity approaching a fire site proves to lie rather low (comparable with the rain drop speed) and the effect on a gas-droplet stream of a high-speed air flow result in its dispersion and deviation from a desired direction. The said factors mainly determine a relatively low fire extinguishing efficiency with the prior art devices and fire extinguishing methods applied with the aid of an aircraft.

SUMMARY OF THE INVENTION

The inventions patented are based on the problem of increasing a fire extinguishing efficiency with, an aircraft application, which is solved on account of generating a high-speed finely dispersed dual-phase flow with a high concentration of extinguishing substance, which shows stability under the effect of disturbing forces as well as the incoming air flow. The properties of a dual-phase flow are provided under certain conditions due to a desired flow structure and its longer range, i.e. in maintaining a sufficiently high speed of liquid flow drops at the distance of more than 50 m.

This technical result is achieved by the fact that in reducing to practice a method of fire extinguishing with an aircraft applied including liquid dispersion in a gas flow, acceleration of a dual-phase flow generated in a gas dynamics nozzle and a directed supply of an accelerated gas-droplet stream into the fire site from board an aircraft, according to the invention, pressure P at the nozzle inlet and relative liquid concentration g in a dual-phase flow are chosen from the following conditions:

$P \geqq 2 \cdot 10^5$Pa $P \cdot g \leqq 5{,}73 \cdot 10^8$Pa,

Where $g = G_l/G_g$ $G_l$—liquid mass flow;

$G_g$—gas mass flow.

For effective fire fighting it is desirable to control a gas-droplet stream by rotating a nozzle and/or pressure control and/or liquid consumption and/or gas consumption at the nozzle inlet.

It is also preferable to fully or partially compensate the disturbing forces acting on a freely flowing gas-droplet stream from board an aircraft by the choice of a jet velocity inclination angle in relation to an aircraft motion velocity.

To achieve the most complete compensation of disturbing forces the velocity inclination angle W of gas-droplet stream in relation to an aircraft velocity V is chosen from minimization condition of a total jet impulse along its flight trajectory in the direction of disturbing force effects.

In the simplest case, when you can neglect an aerodynamic force value acting on a gas-droplet stream, the indication angle α of the gas-droplet stream velocity W in relation to the aircraft velocity V is chosen such as the vector projection W to vector direction V be directed in the opposite direction in relation to vector V arid the condition performed: $\cos \alpha = -|V|/|W|$.

To make a gas-droplet stream compact, i.e. for compensation and reduction of a transverse size of a dual-phase flow, it is preferable to use an annular gas-dynamics nozzle.

A gas flow can be generated with the help of at least one compressor or turbocompressor unit.

For this purpose a turbocompressor unit can be used, which is a part of turbojet engine on board an aircraft.

It is possible to use gas behind the turbojet engine turbine.

To generate a gas flow the working fluid of a cold gas flow of a by-pass turbojet engine can be employed.

Water can be used as liquid meant for fire extinguishing.

An airplane or a helicopter can be preferable as an aircraft.

The said technical result can be also achieved by the fact that the fire extinguishing device with art aircraft applied comprising the onboard liquid vessel meant for fire extinguishing, a liquid and gas mixing chamber connected via a pipeline with the vessel and a gas flow supply system, a means for liquid dispersion fed into the mixing chamber, a gas-dynamics nozzle for gas-droplet stream supply into tho fire site and a directed gas-droplet steam control system according to the invention, a profiled nozzle channel length L is chosen from the condition: $L > 2d_{exit}$, where $d_{exit}$—diameter of nozzle exit cross section, the control system made with a possibility of changing the gas-droplet stream velocity direction and/or the jet velocity value.

It is preferable for the control system to include a unit rotating a gas-dynamics nozzle in relation to an aircraft body.

Liquid and gas supply systems may include pressure and liquid flow control valves.

To make a gas-droplet stream compact, i.e. for compression and reduction of lateral dual-phase flow dimensions, it is preferable to use an annular gas-dynamics nozzle.

It is also preferable for nozzle exit section $d_{exit}$ to be chosen from the condition:

$d_{exit} \geqq H/g$, where H—aircraft flight altitude.

It is also preferable for a gas flow supply system to include at least one compressor or turbocompressor unit.

For this purpose a turbocompressor unit as a part of the onboard turbojet engine can be also used.

It is preferable for the gas flow supply system to be connected with the turbojet engine turbine exit.

The gas flow supply system may be connected with the second contour of a by-pass turbojet engine.

The gas flow supply system may be also connected with a compressor both as part of the aircraft power-plant or a separate independent unit.

Liquid meant for fire extinguishing, in the simplest case, may be water.

It is preferable to use an airplane or a helicopter as an aircraft with a device installed on its board.

BRIEF DESCRIPTION OF THE DRAWINGS

The inventions hereinafter will be described with reference to a specific embodiment illustrated in the accompanying drawings, wherein.

PREFERRED EMBODIMENTS OF THE INVENTION

Figure 1:
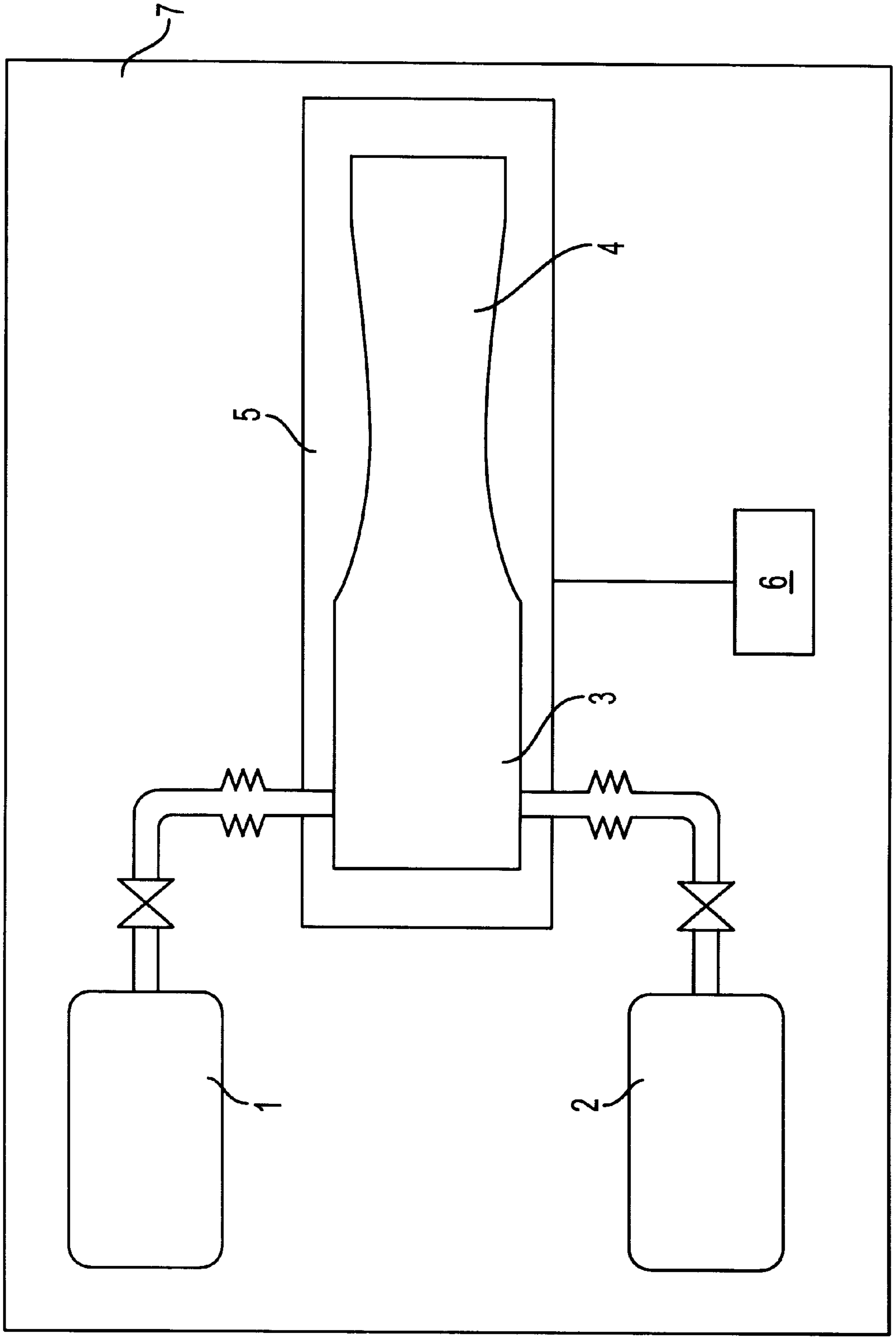
FIG. 1 is a functional schematic view of a fire extinguishing device according to the invention.

A fire extinguishing method can be effected with the help of a device, a functional schematic view of which is illustrated in FIG. 1.

Figure 2:
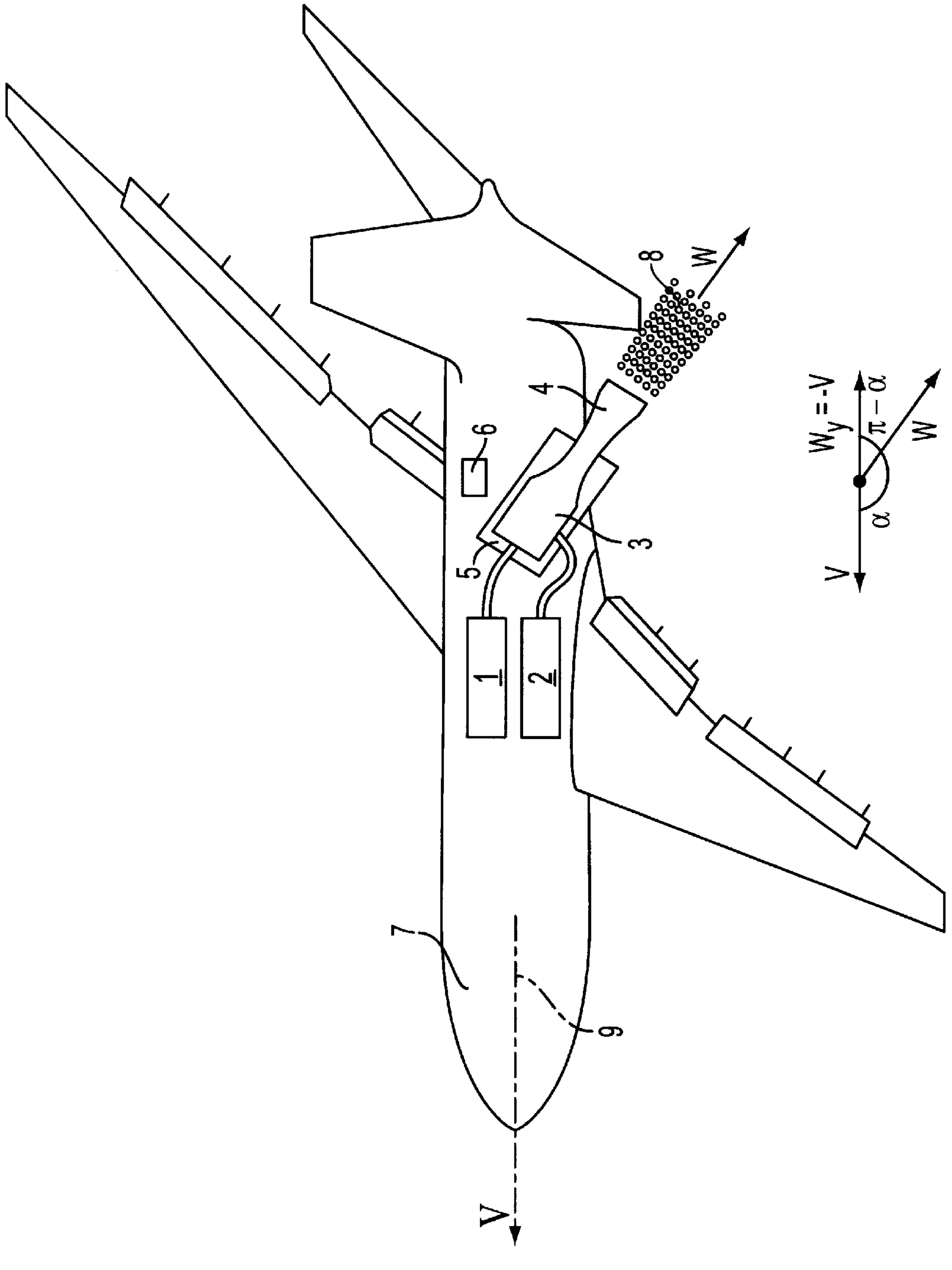
FIG. 2 is a device arrangement view on board an aircraft.

A fire extinguishing device comprises a liquid supply system 1 meant for fire extinguishing, a gas supply system 2, a liquid and gas mixing chamber 3, a gas-dynamics nozzle 4, a controllable platform 5 with a displacement mechanism, on which a nozzle 4 with a chamber 3 are installed, a control system 6, which are placed on board an aircraft, e.g. airplane 7, in its aft part (see FIG. 2).

The nozzle 4 with the help of a moving platform 5 is oriented in the desired direction. For complete compensation of disturbing aerodynamic forces the inclination angle of gas-droplet stream 8 speed vector W with respect to the aircraft speed vector V is chosen from the condition of total jet impulse value minimization along its flight trajectory in the direction of disturbing force effects. In the case considered the speed vector V coincides with the axis of symmetry 9 of the airplane 7 body structure (see FIG. 2).

If in field conditions of device a value of aerodynamic forces acting on a gas-droplet stream can be neglected, the inclination angle a of gas-droplet stream velocity W in relation to the aircraft velocity V is chosen so tat vector W projection to vector V direction be directed in the opposite direction to vector V and the following condition performed: $\cos \alpha = -|V|/|W|$.

In performing these conditions a gas-droplet stream 8 will be directed vertically downwards with respect to the surface of the Earth, if the angle between the vectors V and W is also in the vertical plane or at a small angle to the vertical plane passing through the aircraft axis 9. The latter mode and be used, in case if it is necessary, for any reason, to direct a jet of extinguishing substance at a certain angle to a vertical plane.

As a source of gas, e.g. air, either a gas cylinder system or a turbocompressor unit as a part of a standard turbojet engine, e.g. TB7-117, can be used. This unit can provide gas consumption $m_r = 8{,}5$ kg/s under pressure up to $4\text{–}10^5$ Pa, which determines mixing chamber pressure. The liquid meant for fire extinguishing, water in the said example, is placed in special tanks and supplied to the mixing chamber with the help of expulsion or pump supply system.

Figure 3:
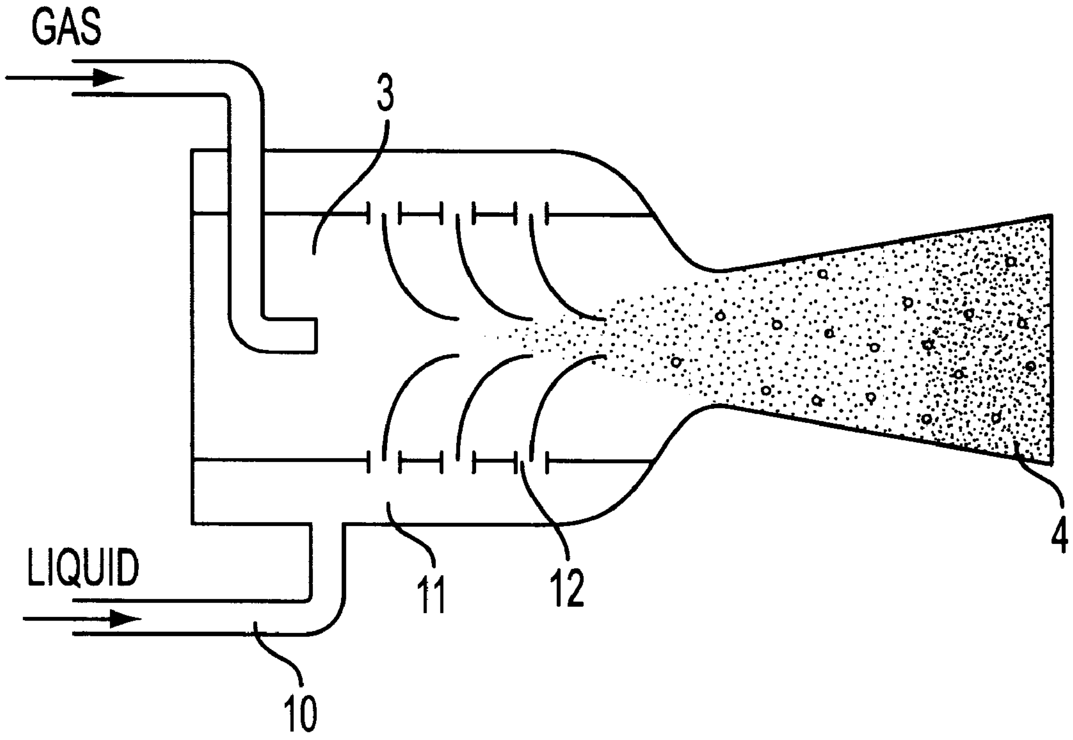
FIG. 3 is a schematic view of mixing chamber and a gas-dynamics nozzle.

The mixing chamber outlet 3 is connected with the nozzle inlet 4 (see FIG. 3) and its inlet—with the gas supply system via a branch pipe 10 and the liquid supply system via a cavity 11 and directly through holes 12 made in the division wall. In this case a performed division wall of the mixing chamber serves as a means of liquid dispersion.

The parameters of the air flow fed into the mixing chamber and the size of the holes 12 are chosen on account of a desired size of liquid drops supplied from the cavity 11 to the mixing chamber 3 in the form of thin jets. It should be noted that other methods of liquid supply to the chamber 3 are possible, e.g. with the help of injectors, as it is done in the similar way in liquid propellant engines. For liquid supply to the mixing chamber 3 an expulsion supply system and be used with the air pumped by a turbocompressor unit or a pump actuated by a turbocompressor aggregate or an electric motor.

Thus obtained a gas-and-drop flow is fed to the nozzle 4 where it is accelerated up to desired speeds. At the nozzle 4 exit a directed gas-droplet stream is produced, which is oriented in a required direction with the help of a control system 6 with respect to the aircraft velocity V.

Figure 4:
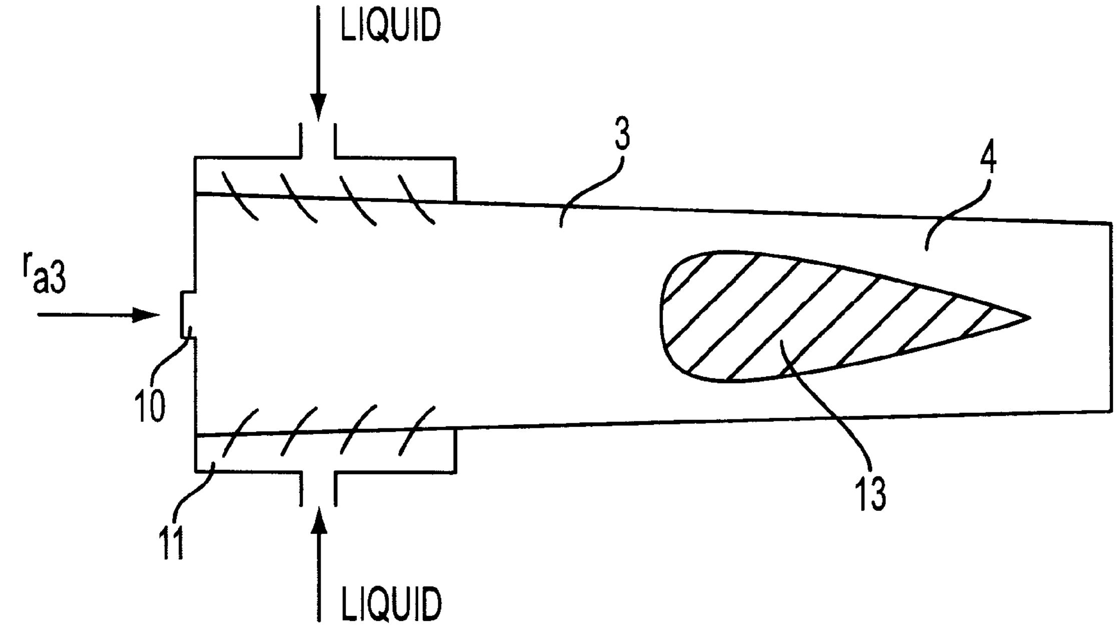
FIG. 4 is a schematic view of mixing chamber and an annular gas-dynamics nozzle.

Another preferred embodiment of the invention employs an annular gas-dynamics nozzle 4 with a central body (see FIG. 4). This nozzle embodiment allows to compact (compress) a gas-droplet stream with relatively uniform water drop distribution along the jet section and, on this account, increase the fire extinguishing liquid concentration in a two-phase jet directed to the fire site.

One of the preferred invention embodiments employs a turbojet engine as a source of gas (see FIGS. 5–7), which comprises a diffuser 14, a compressor 15, a combustion chamber 16, a turbine 17 and a nozzle 18. The air flow is supplied from the compressor outlet 15 see FIG. 5) and through a gas supply pipeline 19 passes into the mixing chamber 3, the dispersed liquid from cavity 11 passing there as well. A dual-phase flow obtained passes in the same way to the nozzle 4, where its acceleration takes place.

Figure 6:
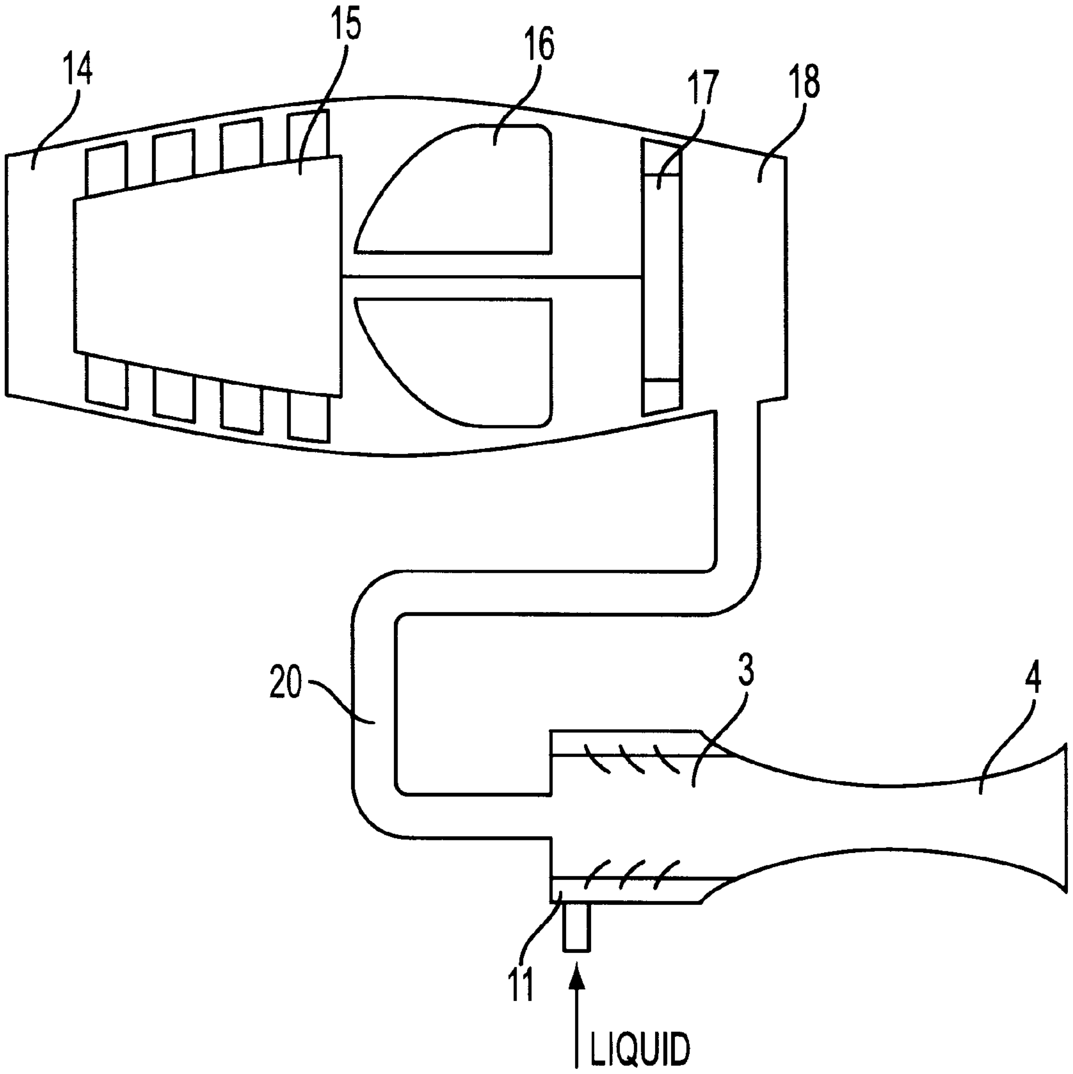
FIG. 6 is a schematic view of TJE combustion product gas supply system.

In another preferred invention embodiment tie working gas may be fed into the mixing chamber 3 from the turbine outlet 7 through the pipeline 20 (see FIG. 6). A bypass TJE can also be; employed with working gas taken either from one or two engine gas flows simultaneously.

Another invention embodiment (see FIG. 7) employs a special gas turbine unit including a compressor 15, a combustion chamber 16, a turbine 17 for compressor 15 drive, a nozzle 18, a free turbine 21, which drives a compressor 22, which serves to obtain a working gas flow. The air, perhaps together with combustion products, passes from the compressor through the gas pipeline 23 into the mixing chamber 3, where it is mixed with a dispersed liquid. Then dual-phase flow obtained is accelerated in the nozzle 4.

A fire extinguishing method with an aircraft application is effected with tie help of the above-mentioned device in the following manner.

A gas flow, in which the dispersed liquid drops are distributed through orifices 12 of cavity 11, is supplied to the mixing chamber 3 (see FIG. 3) through a branch pipe 10. A dual-phase flow produced as a result of liquid and gas mixing is accelerated in the gas-dynamics nozzle 4. The direction of the nozzle 4 and, respectively, velocity vector W of a gas-droplet stream 8 are chosen so as to provide distribution of a dual-phase flow in the fire site direction in a vertical plane during the aircraft flight.

The nozzle 4 inlet pressure P and a relative liquid concentration g in the dual-phase flow are chosen from the following conditions:

$P \geqq 2\cdot10^5$ Pa $P\cdot g \leqq 5{,}7\cdot10^8$ Pa,

Where $g = G_l/G_g$;

$G_l$—liquid mass flow;

$G_g$—gas mass flow.

Maximum gas pressure values $P_{max}$ and relative liquid concentration $g_{max}$ are chosen from the condition of highly dense compactness of liquid particles in a gas flow, when a dispersed liquid structure formation is possible in the dual-phase flow. This condition is characterized by a formula:

$$P_{max} = \pi RT\eta/(1-\pi/6)g_{max},$$

where $\pi = 3{,}1416$;

R—gas constant of a dual-phase flow gas phase (for our $R = 287$ J/kg·K);

T—gas temperature in the nozzle outlet dual-phase flow (for the conditions considered T=300 K);

$r_l$—liquid density in the dual-phase flow (for water $r_l = 1000$ kg/m$^3$).

Taking into account real marginally acceptable possibilities of reducing to practice fire extinguishing method patented, this condition can be written in the following form: $P_{max}\cdot g_{max} = 5{,}7\cdot10^8$ Pa. It is seen from the condition that to reduce the invention to practice the pressure and mass flow values have to he chosen due to $P\cdot g \leqq 5{,}7\cdot10^8$ Pa. The low level of gas pressure at the nozzle 4 inlet is chosen from real condition of a dual-phase flow generation, the exhaust velocity of which is sufficient for effective fire extinguishing from an assigned aircraft flight altitude ($H \geqq 50$ m): $P \geqq 2\cdot10^5$ Pa.

The choice of necessary parameters in accordance with the conditions indicated provides solution of a technical problem put forward on account of jet stability and considerable jet velocity which entering the fire site zone. A required liquid dispersion (size of the drops) is provided in the course of dual-phase flow formation in the mixing chamber 3 and its acceleration in the nozzle 4.

In the example considered the liquid flow is chosen equal $G_l$=100 kg/s, gas flow-$G_g$=8,5 kg/s with pressure P up to $4\cdot10^5$ Pa. With the flow and pressure values chosen the exhaust velocity of the jet is W=130 m/s.

A gas-droplet stream control is effected by a nozzle rotation with the help of moving platform 5, pressure and liquid flow and gas pressure control at the nozzle 4 inlet.

The choice of jet velocity vector inclination angle with respect to aircraft motion velocity vector fully or partially compensates the disturbing forces acting on a gas-droplet stream freely draining from board an aircraft (see FIG. 2).

To achieve the most complete compensation of disturbing aerodynamic forces the inclination angle a of gas-droplet stream vector W with respect to aircraft velocity vector V is chosen from minimization of total jet impulse value along its flight trajectory in the direction of disturbing force effects. For the invention embodiment considered (see FIG. 2) the gas-droplet stream velocity vector W inclination angle $\alpha$ with respect to the aircraft velocity vector V is chosen so that vector W projection upon vector V direction is directed opposite with respect to vector V and the following condition fulfilled: $\cos \alpha=-|V|/|W|$.

In real conditions of carrying out the invention—when an aircraft flies in the proximity of a fire site with the speed of 80 m/s (290 km/hr) at the altitude of 50 m and at the chosen angle of speed vector inclination $\alpha$=130°—the speed of a gas-droplet stream at the fire site surface is more than 50 m/s. Under these conditions the size of liquid drops in the gas-droplet stream will be less than 100 $\mu$m. With these parameters, as the investigations showed, a high efficiency of fire extinguishing is ensured.

Since the speed of a gas-droplet stream is inversely proportional to liquid concentration and its range is directly proportional to liquid concentration, it is preferable to employ a jet compactness, the ability to increase gas pressure at the nozzle inlet limited. This is earned out on account of liquid drop acceleration with low liquid concentration and the following formation of a high-speed gas-droplet stream of a high concentration at the nozzle exit. These conditions are provided by using a profiled annular nozzle 4 in the respective manner (see FIG. 4).

To provide a required range of a gas-droplet stream at the different altitudes of an aircraft flight determined by an aircraft type (airplane or helicopter) the nozzle 4 exit section diameter $d_{exit}$ is chosen depending on possible flight altitude in the proximity of a fire site according to the condition:

$d_{exit} \geqq 0{,}04$ H/g , where H—aircraft flight altitude.

Acceleration of a two-phase gas-and-drop flow up to a desired fire extinguishing speeds W of a jet exhaust is achieved by employing the nozzle 4 with a profiled channel length L chosen from condition: $L>2\ d_{exit}$.

The calculations performed have shown that at the choice of required parameters in accordance with the above mentioned conditions it is possible to extinguish a fire at an aircraft flight speed within the range of 0 to 400 km/hr and flight altitude up to 200 m (optimum values are indicated, though a higher speed and a higher attitude are possible). It should be noted that aircraft-tankers used nowadays for fire extinguishing operate with the flight speed up to 300 km/hr and altitudes up to 100 m.

Figure 5:
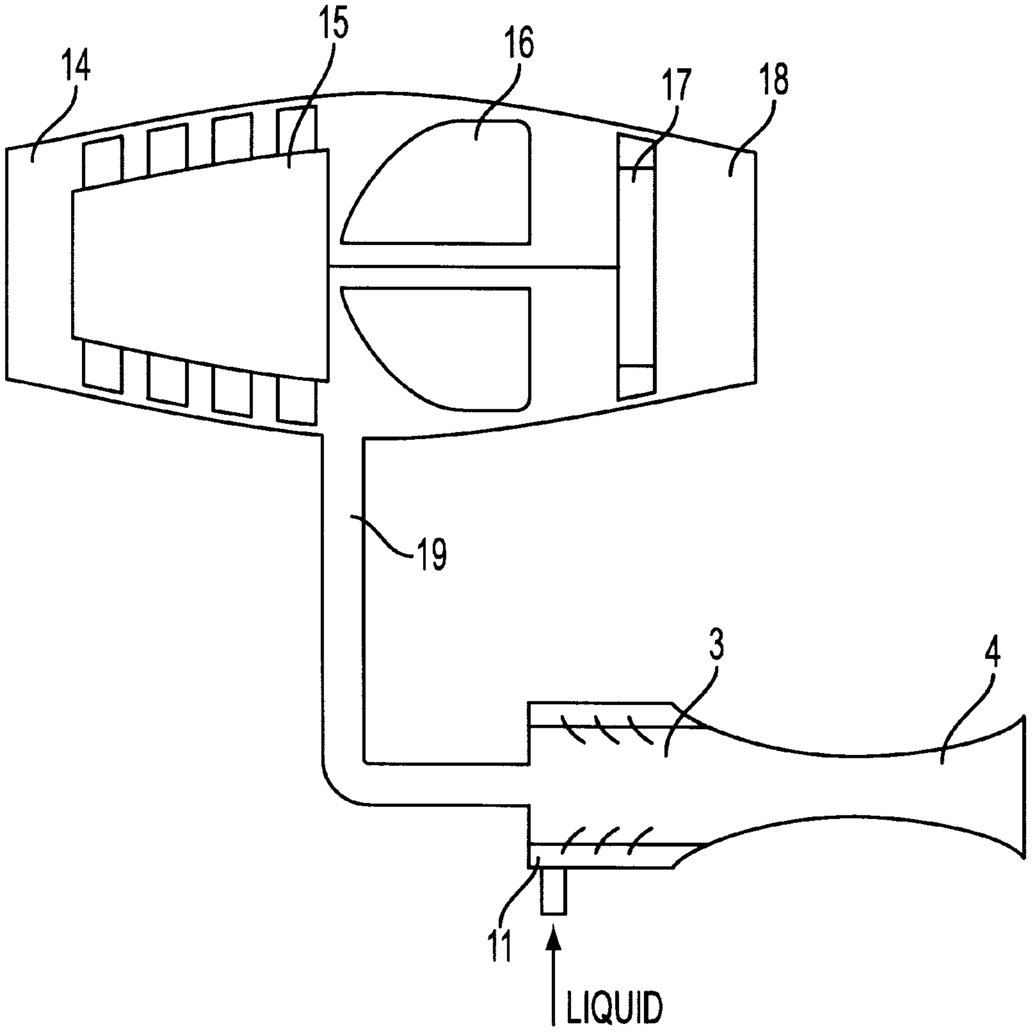
FIG. 5 is a schematic view of a device with air supply from the turbojet engine (TJE)
Figure 7:
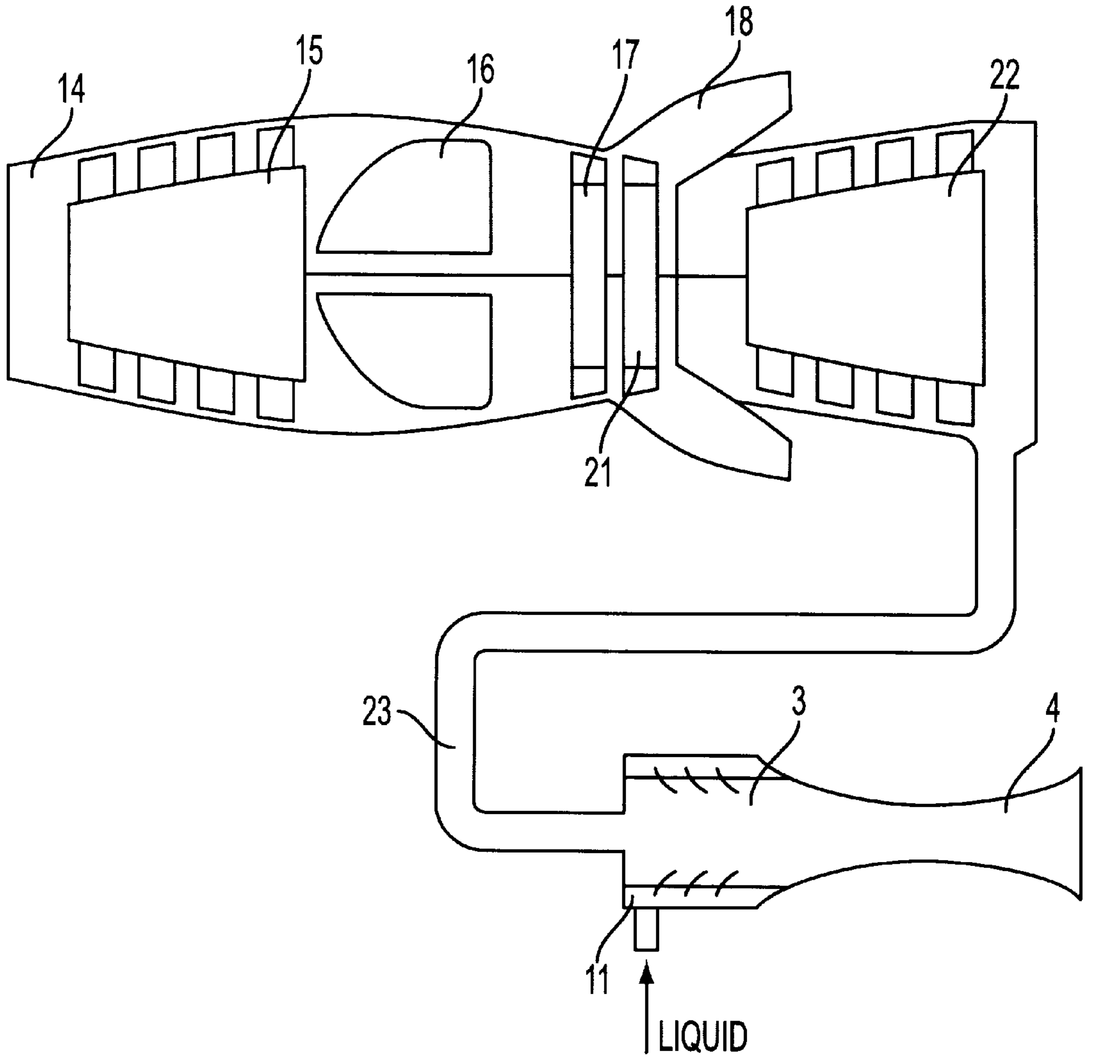
FIG. 7 is a schematic view of a device with air supply from an additional compressor.

A gas flow supplied to a mixing chamber 3 is generated with the help of a turbocompressor unit (see FIGS. 5–7). To create an air flow a few turbocompressor units may be employed.

To reduce the weight and simplify the device structure a turbocompressor unit is used, which is a part of a turbojet engine (TJE) powering an airplane or helicopter.

In one of the method embodiments a gas flow is supplied to the mixing chamber 3 from the compressor exit 15 driven by a turbine 17 (see FIG. 5). A dual-phase flow obtained in the mixing chamber 33 as a result of mixing with dispersed liquid passes into the nozzle 4, where it is accelerated.

In another method embodiment the working gas is supplied to the mixing chamber 3 from turbine exit 17 through the pipe 20 (see FIG. 6). For this purpose a bypass TJE can also be used with working gas take-off from a single or two engine passages simultaneously.

In another method embodiment (see FIG. 7) a special gas-turbine unit is used comprising a free turbine 21, which drives a compressor 22 to obtain the working gas flow. The air, perhaps together with the combustion products, is supplied from the compressor through the gas pipe 23 to the mixing chamber 3, where it is mixed with a dispersed liquid. The dual-phase flow is then accelerated in the nozzle 4.

It should be noted that to generate a gas flow supplied to the mixing chamber 3 both a compressor as a part of the aircraft TJE and a compressor specially designed for fire extinguishing system operation and ensuring gas supply under a desired pressure to the chamber 3 can be employed.

Thus the method and the device patented allow to increase the fire extinguishing efficiency on account of generating a high-speed two-phase jet with a drop dispersion and extinguishing liquid concentration required for effective fire extinguishing. Maintaining two-phase jet parameters while approaching the fire site takes place on account of a certain structure of an accelerated flow and the required speed of liquid drops provided by the choice of parameters in accordance with the said conditions, which finally determines the jet range.

To achieve an object of the invention the following is provided:

a) Maintaining a gas-droplet stream compactness along its whole trajectory of its motion from the nozzle exit section to the fire site;

b) A certain range of drop size in the jet—20 $\mu$m to 200 $\mu$m;

c) Speed excess of drop in the jet while approaching the fire site over the free fall seed of the drops (the speed of a gas-droplet stream a the fire site is in the range 1 m/s to 100 m/s).

INDUSTRIAL APPLICATION

A method and device patented designed for fire extinguishing with an aircraft applied can be used in different fields of activity, where the facilities of fire extinguishing have to be placed on board an aircraft or helicopter, e.g. in agriculture or forestry to extinguish fires on a large territory.

The most effective utilization of inventions is in extinguishing hardly accessible fire sites, where the most effective extinguishing liquid flow rate is required. The inventions can also be successfully applied for extinguishing fires of a higher burn intensity, e.g. at oil flood, oil well firing, etc.

It is preferred to employ the inventions in developing aircraft technology as a system integral in the aircraft arrangement, as well as a detachable unit placed on board a multi-purpose aircraft, when it is necessary.

Though a group of inventions patented has been described in connection with a preferred embodiment, the specialists in this field of technology realize that alterations and other embodiments can take place without deviation from a general idea and subject matter of the invention in accordance with the claims presented.

What is claimed is:

1. A method of fire extinguishing using an aircraft comprising the steps of:

dispersing liquid in a gas flow to generate a dual-phase flow;

accelerating said dual-phase flow in a gas-dynamics nozzle; and directing said accelerated dual-phase flow to a fire site from on board an aircraft wherein a pressure P at a nozzle inlet and a relative liquid concentration g in the dual-phase flow are chosen from the following conditions:

$P \geqq 2 \cdot 10^5$ Pa $P \cdot g \leqq 5{,}7 \cdot 108$ Pa,

Where $g = G_1/G_g$;

$G_l$—liquid mass flow;

$G_g$—gas mass flow.

2. The method of claim 1, wherein the dual-phase flow is controlled by rotating the gas-dynamics nozzle at the nozzle inlet.

3. The method of claim 1, wherein a full or partial compensation of disturbing forces acting on the dual-phase flow freely flowing on board an aircraft is controlled by an inclination angle α of the dual-phase flow speed vector W with respect to an aircraft motion speed vector V.

4. The method of claim 3, wherein the dual-phase flow speed vector W is directed opposite to the aircraft motion speed vector V and the condition fulfilled: $\cos \alpha = -|V|/|W|$.

5. The method of claim 1, wherein an annular gas-dynamics nozzle is used.

6. The method of claim 1, wherein the gas flow generated with at least a single compressor or a turbocompressor unit.

7. The method of claim 6, wherein a turbocompressor unit is used, which is a part of the aircraft turbojet engine.

8. The method of claim 7, wherein a gas behind the turbojet engine turbine is used.

9. The method of claim 7, wherein for gas flow generation a working medium of a second passage of a bypass turbojet engine is used.

10. The method of claim 1, wherein water is used as the liquid dispersion.

11. The method of claim 1, wherein an airplane or a helicopter is used as the aircraft.

12. The method of claim 1, wherein the dual-phase flow is controlled by controlling a pressure of the dual-phase flow at the nozzle inlet.

13. The method of claim 1, wherein the dual-phase flow is controlled by controlling a flow of said liquid at the nozzle inlet.

14. The method of claim 1, wherein the dual-phase flow is controlled by controlling a flow of said gas mass at the nozzle inlet.

15. A device for extinguishing a fire with an aircraft including a liquid tank meant for extinguishing the fire;

a liquid and gas mixing chamber connected through a pipe to the tank;

a gas flow supply system;

a means of dispersing liquid fed into the liquid and gas mixing chamber;

a gas-dynamics nozzle having a profiled nozzle channel of length L and a nozzle exit section diameter $d_{exit}$, for supplying a dual-phase flow to the fire, in which the profiled nozzle channel length L is chosen from a condition $L > 2d_{exit}$; and a directed dual-phase flow control system;

and wherein the control system changes a direction of the dual-phase flow speed vector or jet speed value.

16. The device of claim 15, wherein the control system structure comprises a unit carrying out a gas-dynamics nozzle rotation with respect to an aircraft body.

17. The device of claim 15, wherein liquid and gas supply systems include pressure control valves or liquid or gas flow control valves.

18. The device of claim 15, wherein an annular gas-dynamics nozzle is used.

19. The device of claim 15, wherein the nozzle exit section diameter $d_{exit}$ is chosen from the condition $d_{exit} \geqq 0{,}04\ H/g$, where H—aircraft flight altitude.

20. The device of claim 15, wherein the gas flow supply system comprises at least one compressor or turbocompressor unit.

21. The device of claim 20, wherein a turbocompressor unit is used, which is a part of an aircraft turbojet engine.

22. The device of claim 21, wherein the gas flow supply system is connected with the turbojet engine turbine exit.

23. The device of claim 21, wherein the gas flow supply system is connected with a second passage of a bypass turbojet engine.

24. The device of claim 15, wherein water is used as the liquid.

25. The device of claim 15, wherein an airplane or a helicopter is employed as an aircraft.

* * * * *